(12) United States Patent
Liu

(10) Patent No.: US 9,460,549 B2
(45) Date of Patent: Oct. 4, 2016

(54) METHOD AND DEVICE FOR GENERATING PERSPECTIVE IMAGE

(75) Inventor: Chenggang Liu, Qingdao (CN)

(73) Assignee: HISENSE MOBILE COMMUNICATIONS TECHNOLOGY, Shandong (CN)

( * ) Notice: Subject to any disclaimer, the term of this patent is extended or adjusted under 35 U.S.C. 154(b) by 683 days.

(21) Appl. No.: 13/382,765

(22) PCT Filed: Apr. 1, 2010

(86) PCT No.: PCT/CN2010/071491
§ 371 (c)(1),
(2), (4) Date: Jan. 6, 2012

(87) PCT Pub. No.: WO2011/050601
PCT Pub. Date: May 5, 2011

(65) Prior Publication Data
US 2012/0113114 A1      May 10, 2012

(30) Foreign Application Priority Data
Oct. 30, 2009   (CN) .......................... 2009 1 0205587

(51) Int. Cl.
*G06T 15/20*   (2011.01)
*G06T 7/00*    (2006.01)
*G06K 9/00*    (2006.01)
*G06T 7/20*    (2006.01)
*G06T 7/60*    (2006.01)

(52) U.S. Cl.
CPC ............. *G06T 15/20* (2013.01); *G06T 7/0061* (2013.01); *G06K 9/00791* (2013.01); *G06K 9/00798* (2013.01); *G06T 7/0042* (2013.01); *G06T 7/0075* (2013.01); *G06T 7/2033* (2013.01); *G06T 7/60* (2013.01); *G06T 2207/10012* (2013.01)

(58) Field of Classification Search
None
See application file for complete search history.

(56) References Cited

U.S. PATENT DOCUMENTS 5,870,099 A      2/1999 Horii et al.
6,124,859 A *    9/2000 Horii et al. ................... 345/427
(Continued)

FOREIGN PATENT DOCUMENTS

CN          101061501     10/2007
WO       WO-2006/037129    4/2006

OTHER PUBLICATIONS

International Search Report for PCT/CN2010/071491 mailed Aug. 26, 2010 (with English translation).

*Primary Examiner* — Jwalant Amin
(74) *Attorney, Agent, or Firm* — Foley & Lardner LLP; James F. Ewing; Paul M. H. Pua

(57) ABSTRACT

A method and device for generating a perspective image are provided, which are related to multimedia technology. The method comprises the following steps: acquiring the length, height and vanishing point of a required perspective image and the length and height of an original image; for each pixel point (x', y') in the perspective image, determining the coordinate (x, y) of a pixel point in the original image corresponding to said pixel point; copying the pixel point at the coordinate (x, y) in the original image to the position corresponding to the coordinate (x', y') in said perspective image. The invention utilizes a principle that perspective image is smaller than original image, and employs a form of inverse transform, thereby the calculated pixel points are reduced, and compared with forward calculation, the calculation is greatly reduced, which improves the speed of perspective image generating and saves central processing unit (CPU) resources.

9 Claims, 3 Drawing Sheets

(56) References Cited

U.S. PATENT DOCUMENTS

| | | |
|---|---|---|
| 6,215,516 B1 * | 4/2001 | Ma et al. .................... 348/43 |
| 7,583,858 B2 * | 9/2009 | Gallagher ................ 382/296 |
| 7,737,967 B2 * | 6/2010 | Chernichenko et al. ..... 345/419 |
| 2004/0264763 A1 * | 12/2004 | Mas et al. .................. 382/154 |
| 2006/0066731 A1 * | 3/2006 | Zhou ...................... 348/222.1 |
| 2008/0226171 A1 * | 9/2008 | Yin et al. ................. 382/174 |

\* cited by examiner

METHOD AND DEVICE FOR GENERATING PERSPECTIVE IMAGE

This application is the U.S. National Stage of PCT International Application No. PCT/CN2010/071491, filed Apr. 1, 2010 and entitled "Method and Device for Generating Perspective Image", which claims priority to Chinese Patent Application No. 200910205587.9, filed with the State Intellectual Property Office of People's Republic of China on Oct. 30, 2009 and entitled "Method and Device for Generating Perspective Image". The contents of the foregoing applications are hereby incorporated by reference in their entireties.

FIELD OF THE INVENTION

The present invention relates to the field of multimedia and particularly to a method and device for generating a perspective image.

BACKGROUND OF THE INVENTION

At present, various animation effects in a mobile terminal bring a good experience to a user as the mobile terminal is enhanced in terms of its configuration, and three-dimensional animation effects, including rotary turning of a page and rotation of a cube, especially present very good visual perception, where generation of a perspective image is crucial to present these three-dimension animation effects.

As illustrated in FIG. 1, a visual effect of a cube can be presented simply by performing perspective transformation on an original image toward the left and the right respectively and then splicing, and a special rotation effect of a cube is achieved by changing the perspective angles of perspective images on the left and the right sequentially resulting in a plurality of three-dimension images and then combining them in a plurality of frames and displaying them rapidly and consecutively. Generally, a frame rate above 15 frames per second is required for relatively smooth visual perception, so the two perspective images on the left and the right have to be generated and displayed in 66 milliseconds. In a real system, a CPU may be occupied by other tasks, so there is actually a period of time shorter than 66 milliseconds for generation of the perspective images.

In an existing method for generating a perspective image, each of pixel points of an original image is duplicated according to a function group from $$x' = F(x, y)$$
$$y' = G(x, y)$$

a coordinate space constituted of the x axis and the y axis into a coordinate space constituted of the x' axis and the y' axis, where floating-point and trigonometric function operations involved in the functions F (x, y) and G (x, y) are rather demanding in terms of the performance of a CPU.

A period of time for generation of perspective images combined in a frame is limited by the performance of a CPU, the size of an image and other factors. In a general low- to mid-end cellular phone system of CDMA, a 240×400 display screen and an ARM9 CPU at 192 MHz, for example, are used, and then there are actually only 40 milliseconds for generation of perspective images combined in a frame after the CPU is occupied by display and other tasks, so there are only 20 milliseconds on average for generation of a perspective image, which may be impractical with the foregoing perspective transformation method.

SUMMARY OF THE INVENTION

Embodiments of the invention provide a method and device for generating a perspective image to improve the speed at which the perspective image is generated and save a CPU resource.

A method for generating a perspective image includes:

obtaining length, height and a vanishing point of a required perspective image and length and height of an original image;

determining, for each of pixel points (x', y') in the perspective image, coordinates (x, y) of a pixel point in the original image corresponding to the pixel point (x', y'), according to the length, the height and the vanishing point of the perspective image and the length and the height of the original image; and duplicating the pixel point on the coordinates (x, y) in the original image onto a location in the perspective image corresponding to the coordinates (x', y').

Furthermore, determining, for each of pixel points (x', y') in the perspective image, coordinates (x, y) of a pixel point in the original image corresponding to the pixel point (x', y'), according to the length, the height and the vanishing point of the perspective image and the length and the height of the original image includes:

determining the coordinates (x, y) of the pixel point in the original image corresponding to the pixel point (x', y') according to the length, the height and the vanishing point of the perspective image and the length and the height of the original image, the coordinates (x', y') of the pixel point in the perspective image and a preset function group $$x = f(x')$$
$$y = g(x', y').$$

Still furthermore, the function group $$x = f(x')$$
$$y = g(x', y')$$

includes $x=x'+n \times x'^2$ and $y=a(x') \times y'+b(x')$, wherein $$a(x') = \frac{p}{p-x'}, b(x') = \frac{H \times (p-x') - H' \times p}{2(p-x')},$$
$$n = \frac{W - W'}{W'^2}, H$$

represents the height of the original image, H' represents the height of the perspective image, p represents an abscissa of the vanishing point of the perspective image, W represents the length of the original image, and W' represents the length of the perspective image.

Preferably, the method further includes: before performing calculation with the function group, shifting left a numerator in a parameter by corresponding digits according to a required precision of the parameter;

performing an integer operation with the left-shifted parameter; and shifting right a calculated result by the same digits as that of left-shifting after the integer operation to derive a calculated result in compliance with the required precision.

Furthermore, determining, for each of pixel points (x', y') in the perspective image, coordinates (x, y) of a pixel point in the original image corresponding to the pixel point (x', y'), according to the length, the height and the vanishing point of the perspective image and the length and the height of the original image includes:

for each of values of x' in [0, W'] in the perspective image, determining an abscissa x in the original image corresponding to x', and for each of values of y' in [H'x'/2p, H'−H'x'/2p], determining an ordinate y in the original image corresponding to y', wherein W' represents the length of the perspective image, H' represents the height of the perspective image, and p represents an abscissa of the vanishing point of the perspective image.

Still furthermore, determining, for each of pixel points (x', y') in the perspective image, coordinates (x, y) of a pixel point in the original image corresponding to the pixel point (x', y'), according to the length, the height and the vanishing point of the perspective image and the length and the height of the original image includes:

for each of values of x' in [0, W'] in the perspective image, determining an abscissa x in the original image corresponding to x' in the formula of $x = x' + n \times x'^2$, and determining values of a and b in the formulas of $$a(x') = \frac{p}{p - x'}$$

and $$b(x') = \frac{H \times (p - x') - H' \times p}{2(p - x')};$$

and for each of values of y' in [H'x'/2p, H'−H'x'/2p], determining an ordinate y in the original image corresponding to y' according to the determined values of a and b in the formula of $y = a(x') \times y' + b(x')$.

Preferably, determining, for each of pixel points (x', y') in the perspective image, coordinates (x, y) of a pixel point in the original image corresponding to the pixel point (x', y'), according to the length, the height and the vanishing point of the perspective image and the length and the height of the original image includes:

for each of pixel points with y'≤H'/2 in the perspective image, determining the coordinates (x, y) of the pixel point in the original image corresponding to the pixel point (x', y') according to the length, the height and the vanishing point of the perspective image and the length and the height of the original image, the coordinates (x', y') of the pixel point in the perspective image and a preset function group $$x = f(x')$$
$$y = g(x', y');$$

and for each of the other pixel points in the perspective image, determining directly coordinates (x, H−y) of a pixel point in the original image corresponding to the pixel point (x', H'−y') according to the coordinates (x', y') of the pixel point with y'≤H'/2 and the coordinates (x, y) of the corresponding pixel point in the original image.

A device for generating a perspective image includes:

a unit configured to obtain length, height and a vanishing point of a required perspective image and length and height of an original image;

a unit configured to determine, for each of pixel points (x', y') in the perspective image, coordinates (x, y) of a pixel point in the original image corresponding to the pixel point (x', y'), according to the length, the height and the vanishing point of the perspective image and the length and the height of the original image; and a unit configured to duplicate the pixel point on the coordinates (x, y) in the original image onto a location in the perspective image corresponding to the coordinates (x', y').

Furthermore, the unit configured to determine, for each of pixel points (x', y') in the perspective image, coordinates (x, y) of a pixel point in the original image corresponding to the pixel point (x', y'), according to the length, the height and the vanishing point of the perspective image and the length and the height of the original image includes:

a unit configured to determine the coordinates (x, y) of the pixel point in the original image corresponding to the pixel point (x', y') according to the length, the height and the vanishing point of the perspective image and the length and the height of the original image, the coordinates (x', y') of the pixel point in the perspective image and a preset function group $$x = f(x')$$
$$y = g(x', y').$$

Still furthermore, the unit configured to determine, for each of pixel points (x', y') in the perspective image, coordinates (x, y) of a pixel point in the original image corresponding to the pixel point (x', y'), according to the length, the height and the vanishing point of the perspective image and the length and the height of the original image includes:

a sub-unit configured to, for each of pixel points with y'≤H'/2 in the perspective image, determine the coordinates (x, y) of the pixel point in the original image corresponding to the pixel point (x', y') according to the length, the height and the vanishing point of the perspective image and the length and the height of the original image, the coordinates (x', y') of the pixel point in the perspective image and a preset function group $$x = f(x')$$
$$y = g(x', y');$$

and a sub-unit configured to, for each of the other pixel points in the perspective image, determine directly coordinates (x, H−y) of a pixel point in the original image corresponding to the pixel point (x', H'−y') according to the coordinates (x', y') of the pixel point with y'≤H'/2 and the coordinates (x, y) of the corresponding pixel point in the original image.

A method and device for generating a perspective image according to the embodiments of the invention use the form of inverse transformation under the principle of the area of the perspective image being smaller than that of an original image to thereby reduce the number of calculated pixel points and thus greatly reduce the effort of calculation, improve the speed at which the perspective image is generated and save a CPU resource as compared with a forward operation.

DETAILED DESCRIPTION OF THE EMBODIMENTS

Embodiments of the invention provide a method and device for generating a perspective image in which the form of inverse transformation is used according to the length, the height and the vanishing point of a required perspective image to obtain the coordinates in an original image corresponding to each of points in the perspective image and the point on the corresponding coordinates in the original image is duplicated onto a corresponding location in the perspective image, thereby generating the perspective image. Since the area of the perspective image is smaller than that of the original image, the effort of calculation can be reduced, the speed at which the perspective image is generated can be improved and a CPU resource can be saved.

Figure 1:
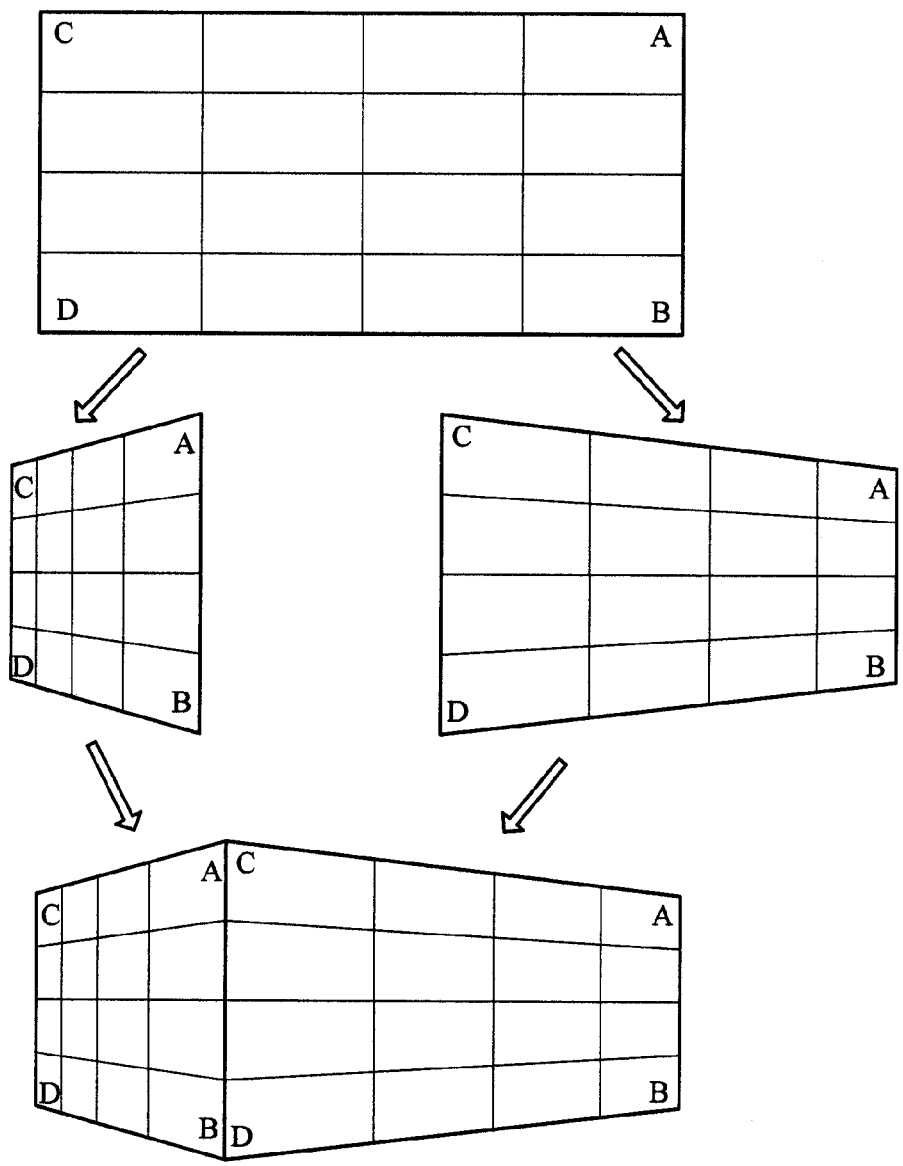
FIG. 1 is a schematic diagram of a principle of generating a three-dimension animation effect in the prior art.
Figure 2:
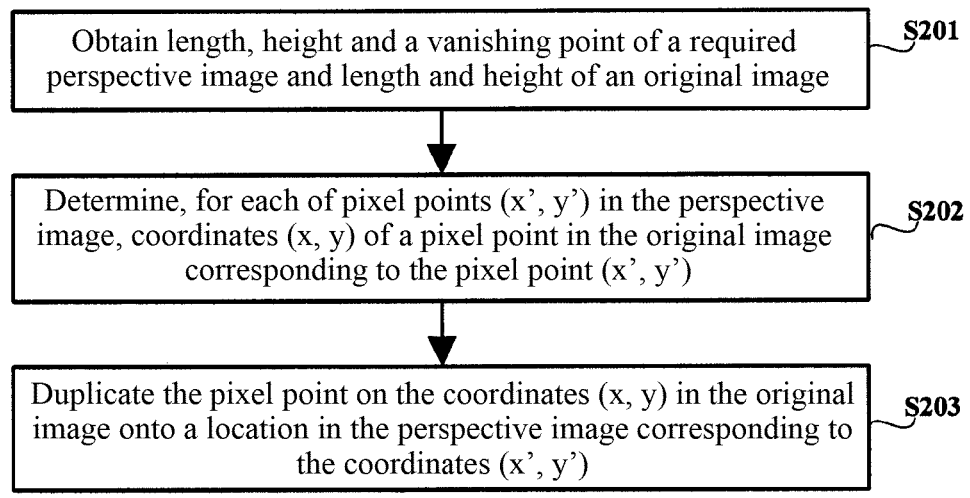
FIG. 2 is a flow chart of a method for generating a perspective image according to an embodiment of the invention.

As illustrated in FIG. 2, a method for generating a perspective image according to an embodiment of the invention includes the following steps.

A step S201 is to obtain length, height and a vanishing point of a required perspective image and length and height of an original image.

The length of the perspective image refers to a difference between abscissas of points with the largest abscissa and with the smallest abscissa in the perspective image, the height of the perspective image refers to a difference between ordinates of points with the largest ordinate and with the smallest ordinate in the perspective image, and the vanishing point refers to a point where straight lines in the perspective image corresponding to horizontal lines in the original image intersect, similarly, the length of the original image refers to a difference between abscissas of points with the largest abscissa and with the smallest abscissa in the original image, and the height of the original image refers to a difference between ordinates of points with the largest ordinate and with the smallest ordinate in the original image.

A step S202 is to determine, for each of pixel points (x', y') in the perspective image, coordinates (x, y) of a pixel point in the original image corresponding to the pixel point (x', y'), according to the length, the height and the vanishing point of the perspective image and the length and the height of the original image.

A step S203 is to duplicate the pixel point on the coordinates (x, y) in the original image onto a location in the perspective image corresponding to the coordinates (x', y').

Thus the perspective image with a pattern of the original image is generated, and two perspective images of the original image toward the left and the right respectively are acquired and then spliced into a three-dimension patter which constitutes one of frames with an animation effect.

More than ten frames to tens of frames are typically required for a full animation effect, and parameters of a perspective image, e.g., a vanishing point, length and height thereof, are determined as preset for each of the frames, so the perspective image required for the frame can be generated simply by calculating according to the predetermined parameters.

Since the area of the perspective image is smaller than that of the original image, the effort of calculation when obtaining the coordinates of the corresponding point in the original image from the coordinates of the pixel point in the perspective image and then duplicating the corresponding point in the original image is much less than that when obtaining the coordinates of the corresponding point in the perspective image from the pixel point in the original image, and generally the height H' of the perspective image is equal to or slightly larger than the height H of the original image due to different angles of view, and when H' is slightly larger than H, H' is typically no more than 1.2 times of H for the sake of a good visual effect. In a practical application, H' is equal to H in most cases, and since the average length of the perspective image is ½ of the original image, the height W' of a trapezium is W/2 and the short side thereof ranges from 0 to H' with H'=H. As can be apparent from the trapezium area formula, the area of the perspective image ranges from ¼ to ½ of the original image, so the effort of calculation can be reduced to ¼ to ½ by obtaining the coordinates of the corresponding points in the original image from the coordinates of the pixel points in the perspective image.

In the step S202, the coordinates (x, y) of the pixel point in the original image corresponding to the pixel point in the perspective image may be calculated with a preset function group $$x = f(x')$$
$$y = g(x', y').$$

The function group may be derived directly from the inverse function of $$x' = F(x, y)$$
$$y' = G(x, y)$$

in the prior art or further simplified.

Due to visually different distances, the corresponding coordinate x' is nonlinearly increased by a decreasing amplitude when the coordinate x in the original image is linearly increased, and the corresponding coordinate x in the original image is nonlinearly increased by an increasing amplitude when the coordinate x' in the perspective image is linearly increased. Thus it is sufficient to comply with this regularity of variation in the simplified formulas, which requires that the first-order derivative of the function x=f (x') is larger than 1 and the second-order derivative thereof is larger than 0. After transformation with the eligible simplified formulas, the resulting perspective image can be made very similar to a perspective image resulting from transformation in a conventional method.

For example, a simple formula in compliance with the regularity is $x=f(x')=x'+n\times x'^2$, where $$n = \frac{W-W'}{W'^2},$$

the first-order derivative of the function is 1+2nx larger than 1 when x>0, and the second-order derivative of the function is 2n>0, thus complying with the foregoing condition, so this function may be used for transformation of the x coordinate, and then $$\frac{H'/2-y'}{p-x'} = \frac{H/2-y}{p}$$

may be derived in the perspective image under a principle of triangle similarity and then rearranged into $$y = \frac{H}{2} - \frac{p\times\left(\frac{H'}{2}-y'\right)}{p-x'} = \frac{p}{p-x'}y' + \left(\frac{H\times(p-x')-H'\times p}{2(p-x')}\right),$$

so particularly in the function group $$x = f(x')$$
$$y = g(x', y'),$$

Figure 3:
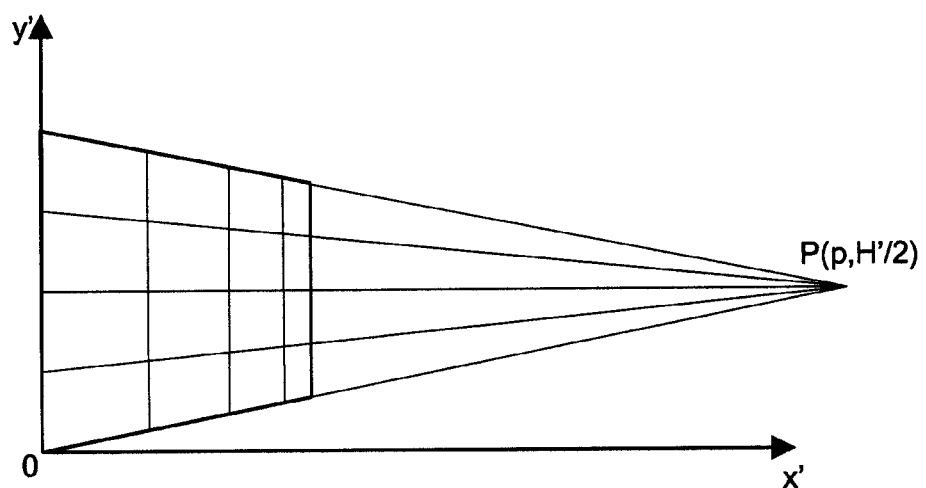
FIG. 3 is a schematic diagram of a perspective image to be generated in an embodiment of the invention.

$x=f(x')=x'+n\times x'^2$ and $$y = \frac{H}{2} - \frac{p\times\left(\frac{H'}{2}-y'\right)}{p-x'} = \frac{p}{p-x'}y' + \left(\frac{H\times(p-x')-H'\times p}{2(p-x')}\right),$$

where H represents the height of the original image, H' represents the height of the perspective image, and p represents an abscissa of the vanishing point of the perspective image, as illustrated in FIG. 3, the vanishing point refers to the point where horizontal lines in the original image intersect in the perspective image, $$n = \frac{W-W'}{W'^2},$$

W represents the length of the original image, and W' represents the length of the perspective image.

$$y = \frac{H}{2} - \frac{p\times\left(\frac{H'}{2}-y'\right)}{p-x'} = \frac{p}{p-x'}y' + \left(\frac{H\times(p-x')-H'\times p}{2(p-x')}\right)$$

may be written as $$y = a(x')\times y' + b(x'),$$

where $a(x') = \frac{p}{p-x'}$ and $b(x') = \frac{H\times(p-x')-H'\times p}{2(p-x')}$.

The parameters shall be calculated with a high precision typically above $2^{-8}$ and even with a precision of $2^{-16}$ for some of the parameters. Since the ARM CPU is not capable of performing calculation on a floating-point number, a floating-point operation on a floating-point number has to be simulated with relevant software, thus degrading the operation speed, and if a parameter is shifted left by the corresponding digits according to the required precision of the parameter prior to calculation and then subject to an integer operation and shifted right by the same digits after the integer operation, then the corresponding precision of the parameter can be maintained while avoiding a floating-point number operation to thereby further improve the operation speed. For example, if n shall be maintained with a precision of $2^{-16}$, the numerator $$W-W' \text{ of } n = \frac{W-W'}{W'^2}$$

is shifted left by 16 digits prior to calculation thereof and then divided by w'^2, and the calculated result is shifted right by 16 digits after multiplication and division operations relating to n are performed, thereby generating a calculated result with a precision of $2^{-16}$. If two or more parameters are shifted in the same calculation process, the digits by which they are shifted shall be determined by the one of the parameters with a higher precision. For example, if both of parameters a and b are involved in the same calculation process but the precision of a is set as $2^{-8}$ and the precision of b is set as $2^{-10}$, calculation is performed with the precision of $2^{-10}$ so that the required parameters are shifted left by 10 digits prior to calculation and subject to an integer operation and then shifted right by 10 digits.

For calculation of n and x, they may be calculated in the following two formulas:

$$n = \frac{(W-W')<<16}{W'^2}$$

and $x=x'+((n\times x'^2)>>16)$, thereby resulting in the value of n and the value of x with a required precision.

Furthermore, since calculation is performed for each of the pixel points in the perspective image and all the values of x, a and b are dependent upon only x' and independent of y' in an implementation and y' is introduced only when the value of y is calculated, x' may be selected as an outer layer of cyclical nesting for calculation of the coordinates (x, y) in an embodiment of the invention to thereby reduce the effort of calculation.

For calculation, firstly for each value of x' in [0, W'] in the perspective image, the abscissa x in the original image corresponding to x' and the value of a and the value of b are determined, and then for each value of y' with respect to the value of x', that is, for each value of y' in $$\left[\frac{H'x'}{2p}, H' - \frac{H'x'}{2p}\right],$$

the ordinate y in the original image corresponding to y' is determined, so that the coordinates in the original image corresponding to the pixel point in the perspective image can be obtained with a less effort of calculation.

Particularly as can be apparent from FIG. 3, for each value of x', a pixel point is present only with y' in the range of $$\left[\frac{H'x'}{2p}, H' - \frac{H'x'}{2p}\right],$$

so it is sufficient to obtain the value of y' taking into account y' lying within the range of $$\left[\frac{H'x'}{2p}, H' - \frac{H'x'}{2p}\right].$$

Furthermore, since the perspective image resulting from perspective transformation is an isosceles trapezium which is symmetrical, that is, the perspective image is symmetrical about a symmetrical axis of y'=H'/2, the coordinates in the original image corresponding to the pixel points in the perspective image may be calculated simply by calculating the coordinates for the part of y'>H'/2 or y'<H'/2 in the formulas and then deriving directly the coordinates in the original image corresponding to the pixel points in the other part of the perspective image due to the symmetry.

For example, if the coordinates (x, y) of the pixel point in the original image corresponding to the coordinates (x', y') of the pixel point in the perspective image are determined, the coordinates (x, H−y) of the pixel point in the original image corresponding to the pixel point (x', H'−y') may be determined directly, and undoubtedly the effort of calculation can be reduced and the speed of calculation can be improved greatly because the coordinates in the original image corresponding to a part of the pixel points in the perspective image are determined due to the symmetry.

An embodiment of the invention provides a method and device for generating a perspective image in which the form of inverse transformation is used under the principle of the area of a perspective image being smaller than that of an original image to thereby reduce the number of calculated pixel points and thus greatly reduce the effort of calculation, improve the speed at which the perspective image is generated and save a CPU resource as compared with a forward operation.

The effort of calculation can be reduced and the precision of calculation can be improved greatly by simplifying an operation function, shifting to obviate a floating-point operation, taking x' as an outer layer of cyclical nesting and obtaining directly the coordinates in the original image corresponding to the pixel points due to the symmetry, and as experimentally demonstrated, it takes less than 10 milliseconds for the ARM9 CPU at 192 MHz to generate a perspective image with W=240, H=H'=400, W'=120 and p=1200, which can fully accommodate a demand in practice.

It shall be noted that the foregoing embodiments are merely illustrative of but not to limit the invention, the invention will not be limited to the examples described above and those technical solutions and modifications thereto without departing from the spirit and scope of the invention shall be encompassed in the scope of the claims of the invention.

The invention claimed is:

1. A method for generating a perspective image, comprising:
    obtaining, by a mobile terminal, length, height and a vanishing point of a required perspective image and length and height of an original image;
    determining that the required perspective image has a number of pixel points and a corresponding area less than that of the original image;
    determining, by the mobile terminal in accordance with the corresponding area being less than that of the original image, for each of pixel points (x', y') in the perspective image, coordinates (x, y) of a pixel point in the original image corresponding to the pixel point (x', y'), according to the length, the height and the vanishing point of the perspective image and the length and the height of the original image; and
    generating, by the mobile terminal, the perspective image by duplicating the pixel point on the coordinates (x, y) in the original image onto a location in the perspective image corresponding to the coordinates (x', y'));
    wherein determining, for each of pixel points (x', y') in the perspective image, coordinates (x, y) of a pixel point in the original image corresponding to the pixel point (x', y'), according to the length, the height and the vanishing point of the perspective image and the length and the height of the original image comprises:
        determining the coordinates (x, y) of the pixel point in the original image corresponding to the pixel point (x', y') according to the length, the height and the vanishing point of the perspective image and the length and the height of the original image, the coordinates (x', y') of the pixel point in the perspective image and one or more preset functions including x=ƒ(x'), wherein x=ƒ(x') comprises x=x'+n×x'$^2$, wherein $$n = \frac{W - W'}{W'^2},$$

W represents the length of the original image, and W' represents the length of the perspective image.

2. The method of claim 1, wherein the one or more preset functions further include y=g(x',y'), wherein y=g(x',y') comprises y=a(x')×y'+b(x'), wherein $$a(x') = \frac{p}{p - x'}, \quad b(x') = \frac{H \times (p - x') - H' \times p}{2(p - x')},$$

H represents the height of the original image, H' represents the height of the perspective image, and p represents an abscissa of the vanishing point of the perspective image.

3. The method of claim 2, further comprising: before performing calculation with the function group, shifting left a numerator in a parameter by corresponding digits according to a required precision of the parameter;

performing an integer operation with the left-shifted parameter; and shifting right a calculated result by the same digits as that of left-shifting after the integer operation to derive a calculated result in compliance with the required precision.

4. The method of claim 2, wherein determining, for each of pixel points (x', y') in the perspective image, coordinates (x, y) of a pixel point in the original image corresponding to the pixel point (x', y'), according to the length, the height and the vanishing point of the perspective image and the length and the height of the original image comprises:

for each of values of x' in [0, W'] in the perspective image, determining an abscissa x in the original image corresponding to x' in the formula of $x=x'+n \times x'^2$, and determining values of a and b in the formulas of $$a(x') = \frac{p}{p-x'}$$

and $$b(x') = \frac{H \times (p-x') - H' \times p}{2(p-x')};$$

and for each of values of y' in [H'x'/2p, H'−H'x'/2p], determining an ordinate y in the original image corresponding to y' according to the determined values of a and b in the formula of $y=a(x') \times y'+b(x')$.

5. The method of claim 2, wherein determining, for each of pixel points (x', y') in the perspective image, coordinates (x, y) of a pixel point in the original image corresponding to the pixel point (x', y'), according to the length, the height and the vanishing point of the perspective image and the length and the height of the original image comprises:

for each of pixel points with y'≤H'/2 in the perspective image, determining the coordinates (x, y) of the pixel point in the original image corresponding to the pixel point (x', y') according to the length, the height and the vanishing point of the perspective image and the length and the height of the original image, the coordinates (x', y') of the pixel point in the perspective image and the one or more preset functions; and for each of the other pixel points in the perspective image, determining directly coordinates (x, H−y) of a pixel point in the original image corresponding to the pixel point (x', H'−y') according to the coordinates (x', y') of the pixel point with y'≤H'/2 and the coordinates (x, y) of the corresponding pixel point in the original image.

6. A device for generating a perspective image, comprising:

a memory configured to store computer readable program codes; and one or more processors configured to execute the computer readable program codes to implement:

a unit configured to obtain length, height and a vanishing point of a required perspective image and length and height of an original image;

a unit configured to determine that the required perspective image has a number of pixel points and a corresponding area less than that of the original image;

a unit configured to determine, in accordance with the corresponding area being less than that of the original image, for each of pixel points (x', y') in the perspective image, coordinates (x, y) of a pixel point in the original image corresponding to the pixel point (x', y'), according to the length, the height and the vanishing point of the perspective image and the length and the height of the original image; and a unit configured to generate the perspective image by duplicating the pixel point on the coordinates (x, y) in the original image onto a location in the perspective image corresponding to the coordinates (x', y');

wherein the unit configured to determine, for each of pixel points (x', y') in the perspective image, coordinates (x, y) of a pixel point in the original image corresponding to the pixel point (x', y'), according to the length, the height and the vanishing point of the perspective image and the length and the height of the original image comprises:

a unit configured to determine the coordinates (x, y) of the pixel point in the original image corresponding to the pixel point (x', y') according to the length, the height and the vanishing point of the perspective image and the length and the height of the original image, the coordinates (x', y') of the pixel point in the perspective image and one or more preset functions including x=ƒ(x'), wherein x=ƒ(x') comprises $x=x'+n \times x'^2$, wherein $$n = \frac{W-W'}{W'^2},$$

W represents the length of the original image, and W' represents the length of the perspective image.

7. The device of claim 6, wherein the one or more preset functions further include y=g(x',y'), wherein y=g(x',y') comprises $y=a(x') \times y'+b(x')$, wherein $$a(x') = \frac{p}{p-x'}, \; b(x') = \frac{H \times (p-x') - H' \times p}{2(p-x')},$$

wherein H represents the height of the original image, H' represents the height of the perspective image, and p represents an abscissa of the vanishing point of the perspective image.

8. The device of claim 7, wherein the unit is configured to determine, for each of pixel points (x', y') in the perspective image, coordinates (x, y) of a pixel point in the original image corresponding to the pixel point (x', y'), according to the length, the height and the vanishing point of the perspective image and the length and the height of the original image comprises:

a sub-unit configured to, for each of pixel points with y'≤H'/2 in the perspective image, determine the coordinates (x, y) of the pixel point in the original image corresponding to the pixel point (x',y') according to the length, the height and the vanishing point of the perspective image and the length and the height of the original image, the coordinates (x',y') of the pixel point in the perspective image and the one or more preset functions; and a sub-unit configured to, for each of the other pixel points in the perspective image, determine directly coordinates (x, H−y) of a pixel point in the original image corresponding to the pixel point (x', H'−y') according to the coordinates (x', y') of the pixel point with y'≤H'/2 and the coordinates (x, y) of the corresponding pixel point in the original image.

9. A method for generating a perspective image, comprising:
obtaining, by a mobile terminal, length, height and a vanishing point of a required perspective image and length and height of an original image;
determining that the required perspective image has a number of pixel points and a corresponding area less than that of the original image;
determining, by the mobile terminal in accordance with the corresponding area being less than that of the original image, for each of pixel points (x', y') in the perspective image, coordinates (x, y) of a pixel point in the original image corresponding to the pixel point (x', y'), according to the length, the height and the vanishing point of the perspective image and the length and the height of the original image; and
generating, by the mobile terminal, the perspective image by duplicating the pixel point on the coordinates (x, y) in the original image onto a location in the perspective image corresponding to the coordinates (x', y');
wherein determining, for each of pixel points (x', y') in the perspective image, coordinates (x, y) of a pixel point in the original image corresponding to the pixel point (x', y'), according to the length, the height and the vanishing point of the perspective image and the length and the height of the original image comprises:
for each of values of x' in [0, W'] in the perspective image, determining an abscissa x in the original image corresponding to x', and for each of values of y' in [H'x'/2p, H'−H'x'/2p], determining an ordinate y in the original image corresponding to y', wherein W' represents the length of the perspective image, H' represents the height of the perspective image, and p represents an abscissa of the vanishing point of the perspective image.

* * * * *